United States Patent [19]

Hunt et al.

[11] Patent Number: 5,578,700
[45] Date of Patent: Nov. 26, 1996

[54] CONTINUOUS VACUUM MICROWAVE RUBBER CRUMB RECLAMATION UNIT

[75] Inventors: James R. Hunt, Tucker; Jerry L. Hunt, Rossville, both of Ga.

[73] Assignee: Hunt Industries Inc., Tucker, Ga.

[21] Appl. No.: 431,547

[22] Filed: May 1, 1995

[51] Int. Cl.⁶ .................................. C08C 3/02; C08C 2/00
[52] U.S. Cl. ........................ 528/501; 521/41; 521/45.5; 523/300; 523/340; 264/102; 241/23; 425/174.4; 209/930
[58] Field of Search .................... 521/41, 45.5; 523/300, 523/340; 528/501; 264/102; 241/23

[56] References Cited

U.S. PATENT DOCUMENTS

| | | | |
|---|---|---|---|
| 4,104,205 | 8/1978 | Novotny et al. | 521/45.5 |
| 5,316,224 | 5/1994 | Dobozy | 241/30 |
| 5,362,759 | 11/1994 | Hunt et al. | 521/44.5 |

FOREIGN PATENT DOCUMENTS 0284407  12/1986  Japan ...................... 523/340

*Primary Examiner*—Paul R. Michl
*Assistant Examiner*—Andrew E. C. Merriam
*Attorney, Agent, or Firm*—John Lezdey

[57] ABSTRACT

The invention provides an apparatus and method of its use, for recovering either devulcanized rubber or purified carbon and volatiles from a crumb rubber feed material. The apparatus comprises a chamber; a vacuum pump for providing reduced pressure within the chamber; an inlet for feeding crumb rubber into the chamber; an auger for providing continuous movement of the crumb rubber though the chamber; a battery of microtrons for providing substantially precise energy input into the crumb rubber as it is continuously moved through the chamber by the auger; at least one condenser for recovering volatiles from the crumb rubber after it has been sufficiently heated by said the microtrons; and an outlet for withdrawing either a devulcanized rubber or a purified carbon product residue from the chamber.

3 Claims, 1 Drawing Sheet

CONTINUOUS VACUUM MICROWAVE RUBBER CRUMB RECLAMATION UNIT

FIELD OF THE INVENTION

The instant invention involves a novel apparatus and method for its use, that enables the recovery of fuel oil and pure carbon or devulcanized rubber products from a crumb rubber previously reclaimed from pre-softened refuse tires and/or portions, by another apparatus and method for its use, which is the separate subject of applicant's co-pending patent application Ser. No. 08/333,839, filed Nov. 3, 1994.

DESCRIPTION OF THE PRIOR ART

Although the instant invention has a broader application which includes, but is not limited to: (a) the break-down of sewage sludge to pure fertilizers; (b) the recovery of fertilizers from farm wastes, orchard wastes and/or sugar cane bottoms; (c) the recovery of heavy metals from industrial waste; (d) the recovery of fuel oil from oil shales; and, (e) the recycle of medical wastes; for simplicity's sake, it will be described herein only in reference to the recovery fuel oil and pure carbon or alternatively a devulcanized rubber product from rubber crumb which has previously been recovered from another apparatus and method for its use.

Due in greatest part to the ever increasing concern for our environment, the problems associated with the disposal of refuse vehicle tires has received much attention in the recent years. Burial of refuse tires has proven to be an unsatisfactory disposal alternative. Thus, with an increasing frequency they have been stored in dumps, wherein they present a constant fire hazard and otherwise, a convenient breeding ground for mosquitos and other non-beneficial insects that flourish within pocket of water trapped in them.

Although it is recognized that refuse tires can be burned for the generation of power, cost efficiency and environmental considerations have made this alternative unfeasible in most instances.

Re-capping of old tires has proven to be unfeasible since the longer molecules which impart strength to the rubber are broken down during the remolding process.

Recycling would appear to be the only reasonable alternative to deal with the growing problem. There are, however, many problems that effect the cost efficiency of various recycle schemes which have been proposed before now. Modern tires are of a composite construction which can include bead wires or wire mesh, and steel or fiber belting, in addition to the profitably recoverable carbon or rubber, and volatile components. Hence, energy and equipment intensive solids separation processes have been required to recover the rubber.

Exemplary of such schemes are U.S. Pat. Nos. 3,721,392 and 3,658,267 to Burwell, which both show removal of rubber from refuse tires by abrasion with an endless belt or sander.

U.S. Pat. Nos. 3,693,894 to Willette and 1,498,935 to Shull disclose cutting members, as an alternative to the abrasive members of Burwell.

U.S. Pat. No. 5,322,792 to Peguy, teaches the shredding of worn tires by high speed grinder chains, while U.S. Pat. No. 4,840,316 to Barclay, discloses a high speed, rotating rasp.

Once the rubber crumb is recovered, the apparatus, and method for its use of the instant invention, is employed to recover fuel oil and pure carbon products from it. Exemplary of prior art devices and processes more particularly pertinent to the instant invention are the following:

U.S. Pat. No. 5,330,623, shows use of microwave energy to destructively distill organic materials such as waste tire compound to recover a elemental carbon and gaseous products.

U.S. Pat. No. 5,174,465, shows the microwave distillation of dry-cleaning machine sludge to recover organic solvents therefrom.

U.S. Pat. No. 5,145,576, shows a device for treating human or animal dejections, which includes a microwave applicator, a transporter screw and a vapor extractor.

None of the foregoing show the instant novel combination of process and apparatus elements designed specifically to treat the instantly disclosed feed materials.

Therefore, some of the objects of the instant invention are to provide an apparatus and method of its use, which enables: (a) the break-down of sewage sludge to pure fertilizers; (b) the recovery of fertilizers from farm wastes, orchard wastes and/or sugar cane bottoms; (c) the recovery of heavy metals from industrial waste; (d) the recovery of fuel oil from oil shales; (e) the recycle of medical wastes; and, the recovery fuel oil and pure carbon, or alternatively, a devulcanized rubber product from rubber crumb which has previously been recovered from another apparatus and method for its use, and numerous other applications, with: (1) reduced energy requirements; (2) minimal equipment down-time; (3) minimal degradation of product components of the feed material; and, (4) minimal environmental impact.

SUMMARY OF THE INVENTION

The instant invention provides an apparatus and an method of using the apparatus, which processes, among others feed as illustrated above, such as devulcanized rubber crumb. The devulcanized rubber crumb which is recovered from an apparatus and method for its use, is the subject of applicant's co-pending patent application Ser. No. 08/333,839.

The invention provides an apparatus and method of its use, for recovering either devulcanized rubber or purified carbon and volatiles from a crumb rubber feed material. The apparatus comprises a chamber; a vacuum pump for providing reduced pressure within the chamber; an inlet for feeding crumb rubber into the chamber; an auger for providing continuous movement of the crumb rubber though the chamber; a battery of microtrons for providing substantially precise energy input into the crumb rubber as it is continuously moved through the chamber by the auger; at least one condenser for recovering volatiles from the crumb rubber after it has been sufficiently heated by said the microtrons; and an outlet for withdrawing either a devulcanized rubber or a purified carbon product residue from the chamber.

The rubber crumb is preferably pneumatically conveyed from storage stocks to a plurality of hoppers from which is fed in a semi-batch manner into a treatment chamber. An auger is positioned within the chamber for moving crumb which has been charged to the chamber in a substantially, even, continuous manner along its horizontal longitudinal axis. Preferably the chamber is of a cylindrical or tubular design with rounded ends, so as to reduce "hot spots" during operation, and to otherwise most efficiently accommodate the auger. Microtrons (i.e., microwave generators) are positioned over the length of the auger, along the path of the continually charged crumb feed, in order to enable substantially precise temperature control by precisely controlling the input of energy into the charged crumb feed as it moves through the chamber. In order to substantially minimize corrosion of the auger due to the electromagnetic fields which are created within the chamber during operation, stainless steel is a preferably selected as its material of construction. Typically the feed material is irradiated at about 1.0 to 5.0 GHZ, preferably about 2.4 GHZ. In addition to microwave generators, a vacuum pump is also provided to produce precise control of a negative pressure within the chamber. Within the chamber, a typical pressure range of about 24 to about 28 inches of mercury is preferred. Thus, by precisely controlling temperature and subatmospheric pressure, chemical destruction of valuable product components in the feed mass can be substantially precluded. Both the inlets and the outlets of the chamber are preferably provided with duplex hoppers or bins which enable semi-batch feed and product withdrawal, when the apparatus is used for producing fuel oil and carbon, a carbon product of a purity of up to about 95.4% is recoverable, as compared to purities of only about 70 to about 75% from presently known apparatuses and methods of their use. The combination of the solvents of the invention and the microwave energy cause the devulcanization of rubber crumb.

DETAILED DESCRIPTION OF THE INVENTION

Figure 1:
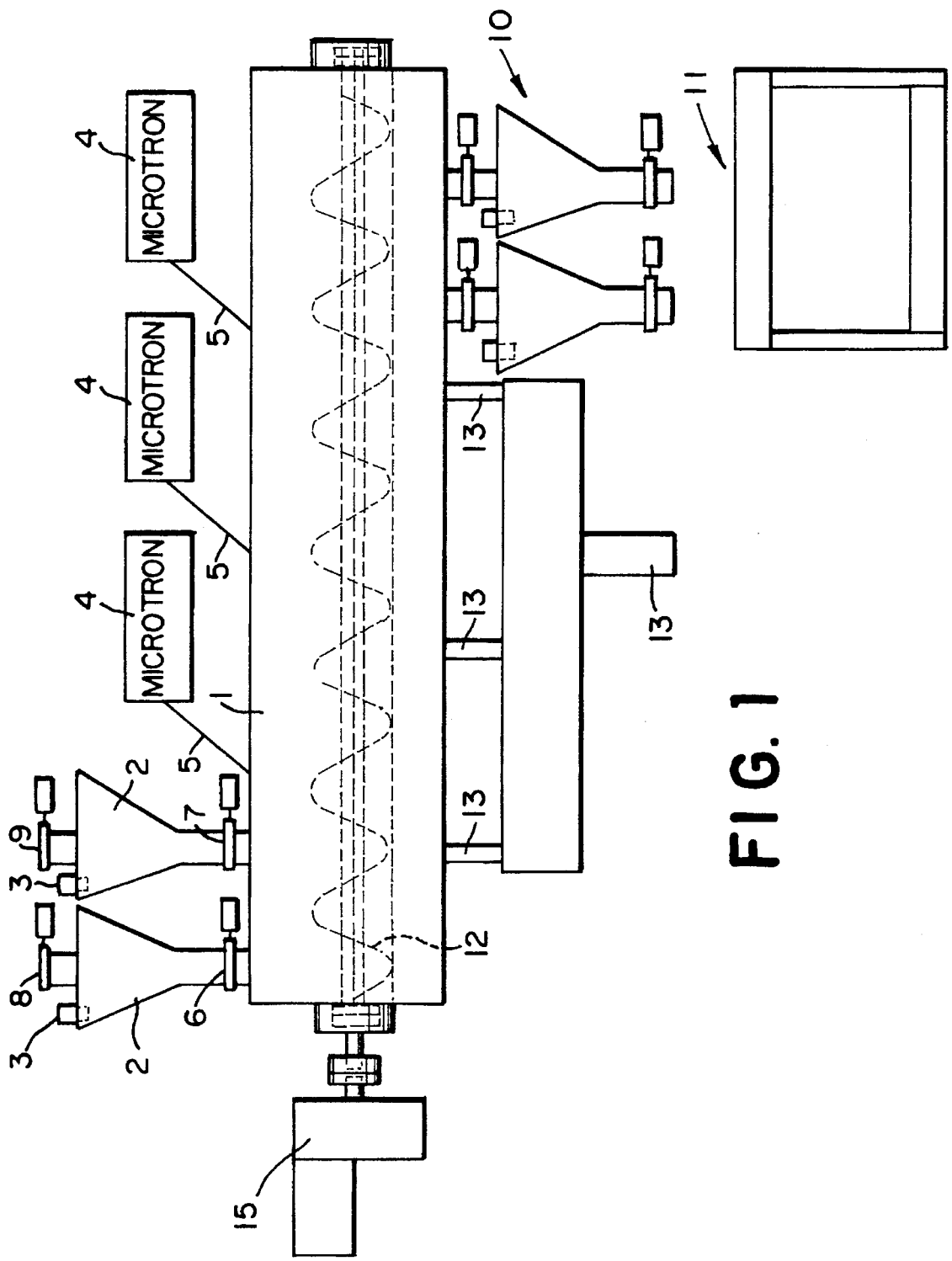
FIG. 1 illustrates, in detail, the apparatus of the instant invention, and can be used to describe the method of its use.

Rubber crumb is conveyed through pneumatic lines 3, to duplex hoppers 2. Vacuum lock valves 6–9 are manipulated to provide alternate semi-batch filling and discharge of hoppers 2, so that rubber crumb can be substantially continuously charged to the chamber 1. The rubber crumb which is charged at the inlet is moved by auger 1a, under microtrons 4 toward the outlet. The microtrons are provided with waveguides 5, for precisely directing energy to the rubber crumb feed mass, thereby enabling precise temperature control thereof. In addition to temperature control, vacuum lines 13 are provided to enable precise control of subatmospheric pressures within the chamber. Volatiles oil product are withdrawn from the chamber through the vacuum lines and condensed in condensers (not shown). The residual carbon or devulcanized rubber is withdrawn through the outlet into duplex bins 10. Vacuum lock valves are manipulated to provide alternate semi-batch filling and discharge of bins 10, in a manner similar to that by which crumb rubber is charged to the chamber. Carbon or devulcanized rubber products which is discharged to the bins can be either emptied into i.e., Fifty (50) pound bags or on to a conveyor 11.

The instant invention provides an apparatus for the recovery of volatiles from feed material, comprising: a first element including a chamber; a second element for providing reduced pressure within said chamber; a third element including an auger for providing continuous movement of said feed material though said chamber; a fourth element for rotating said auger; a fifth element including means for providing substantially precise energy input into said feed material as it is continuously moved through said chamber by said auger; a sixth element for recovering volatiles form said feed material after it has been sufficiently heated by said fifth element; a seventh element for introducing said feed into said chamber; and an eighth element for withdrawing residue from said chamber. The said first to eighth elements being sized, spaced and dimensioned for processing one feed material selected from the group consisting of: crumb rubber, sewage sludge, farm waste, orchard waste, sugar cane bottoms, heavy metal industrial sludge, oil shale, and medical waste.

It can therefore be seen that the method of the invention provides for the continuous removal of volatiles from feed material. Namely, a first chamber which is under reduced pressure has feed material continuously moving therethrough. The feed material in the first chamber is irradiated with microwave energy to heat and remove volatiles. As the residue is being discharged from the first chamber, a second chamber is fed the feed material. The material in the second chamber then undergoes the same process steps as occurring in the first chamber. The process is then repeated in the first chamber or within further chambers which may be provided.

Although the invention has been described with reference to certain preferred embodiments, it will be appreciated that many variations and modifications my be made within the scope of the broad principles of the invention. Hence, it is intended that the preferred embodiments and all of such variations and modifications be included within the scope and spirit of the invention, as defined by the following claims.

What is claimed is:

1. A method for continuously removing volatiles from rubber and recovering rubber crumb, comprising:
   a) providing an apparatus comprising a first and second chamber; b) reducing the pressure within said first chamber; c) continuously moving rubber particles through said first chamber with a screw conveyor; d) providing substantially precise microwave energy input into said rubber particles without any substantial chemical destruction of volatile components as it is continuously moved through said first chamber; e) recovering volatiles from said rubber particles after it has been sufficiently heated by said means for providing substantially precise microwave energy input; f) withdrawing rubber crumb from said first chamber, and repeating steps b) through f), for said second chamber.

2. The process of claim 1 wherein said reduced pressure comprises a vacuum.

3. The process of claim 1 wherein said microwave energy is about 2.4 GHZ.

* * * * *